(12) United States Patent
Kinzel et al.

(10) Patent No.: US 12,312,550 B2
(45) Date of Patent: May 27, 2025

(54) METHOD FOR PROVIDING RAW MATERIAL FOR AN INDUSTRIAL PROCESS

(71) Applicant: PAUL WURTH S.A., Luxembourg (LU)

(72) Inventors: Klaus Peter Kinzel, Sandweiler (LU); Georg Strüber, Frisange (LU); Juan Luis De Frutos Santamaria, Schifflange (LU)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 18/286,644

(22) PCT Filed: Apr. 20, 2022

(86) PCT No.: PCT/EP2022/060403
§ 371 (c)(1),
(2) Date: Oct. 12, 2023

(87) PCT Pub. No.: WO2022/223605
PCT Pub. Date: Oct. 27, 2022

(65) Prior Publication Data
US 2024/0191151 A1    Jun. 13, 2024

(30) Foreign Application Priority Data
Apr. 20, 2021    (LU) .................................. 500064

(51) Int. Cl.
*C10L 5/00*    (2006.01)
*C10L 5/44*    (2006.01)
*C10L 9/08*    (2006.01)

(52) U.S. Cl.
CPC ............... *C10L 5/447* (2013.01); *C10L 9/083* (2013.01); *C10L 2290/24* (2013.01); *C10L 2290/28* (2013.01)

(58) Field of Classification Search
CPC ..... C10B 53/02; C10B 57/14; C10L 2270/00; C10L 2290/02; C10L 2290/06;
(Continued)

(56) References Cited

FOREIGN PATENT DOCUMENTS

EP    1879980 B1 *  4/2013   ........... A01D 43/003
FR    736302   A    11/1932
(Continued)

OTHER PUBLICATIONS

International Search Report for corresponding application PCT/EP2022/060403 filed Apr. 20, 2022; Mail date Jul. 19, 2022.
(Continued)

*Primary Examiner* — Ellen M McAvoy
*Assistant Examiner* — Chantel Graham
(74) *Attorney, Agent, or Firm* — CANTOR COLBURN LLP

(57) ABSTRACT

A method for providing raw material for an industrial process, in particular for steel production, the method including torrefying a torrefaction material, which contains biomass, in a reactor by thermochemically treating the torrefaction material at 200° C. to 600° C., to obtain bio coal, extracting the bio coal from the reactor at a first temperature of up to 600° C., providing bulk materials at a second temperature between 0° C. and 100° C., mixing bio coal with bulk material, thereby cooling down the bio coal with the bulk material and obtaining a mixture of bulk material and bio coal at a third temperature, below the self-ignition temperature of the mixture, and using the mixture to provide the raw material for the industrial process.

16 Claims, 2 Drawing Sheets

(58) Field of Classification Search
CPC ......... C10L 2290/141; C10L 2290/146; C10L 2290/24; C10L 2290/28; C10L 2290/30; C10L 5/00; C10L 5/447; C10L 5/46; C10L 5/48; C10L 9/08; C10L 9/083; Y02E 50/10; Y02E 50/30
See application file for complete search history.

(56) References Cited

FOREIGN PATENT DOCUMENTS

| | | | |
|---|---|---|---|
| JP | 2004204132 A | 7/2004 | |
| WO | 2006117006 A1 | 11/2006 | |
| WO | 2015041534 A1 | 3/2015 | |

OTHER PUBLICATIONS

Written Opinion for corresponding application PCT/EP2022/060403 filed Apr. 20, 2022; Mail date Jul. 19, 2022.

\* cited by examiner

METHOD FOR PROVIDING RAW MATERIAL FOR AN INDUSTRIAL PROCESS

TECHNICAL FIELD

The disclosure relates to a method for providing raw material for an industrial process.

BACKGROUND ART

A major challenge in the industry, in particular in the steel industry and electric power plants, is the reduction of $CO_2$ emissions. One interesting possibility is the use of biomass. However, it has been seen that this is not economically viable since the production of charcoal from biomass is very expensive when compared to fossil fuel.

It is thus an objective of the current disclosure to provide a method which allows to increase the technical feasibility and the economic viability of the biomass production and utilization by its integration into another process, in particular the steel making process.

According to WHO, a carbon footprint is a measure of the impact that activities (in this case, the production of iron and steel) have on the amount of carbon dioxide ($CO_2$) produced through the burning of fossil fuels and is expressed as a weight of $CO_2$ emissions produced in tonnes.

The use of biomass in the steelmaking process is very difficult since the biomass contains high and varying amounts of volatiles. As a result, the application of biomass directly in the steel making process would be counterproductive.

a. When injected into the blast furnace, the conditions at the tuyere will require a high amount of oxygen to maintain the required temperature of normally >2000° C. This will require to additionally burn coal and/or coke. Besides the negative effect on the economics, this also strongly reduces the achievable $CO_2$ savings from the utilization of biomass.

b. In case of the sinter plant, highly volatile solid fuel utilization like biomass in the sinter bed is also not recommended. In fact, highly volatile contents need to be avoided from the security point of view since the volatiles accumulate in the off gases and might provoke fires in the gas cleaning installation of the sinter plant.

c. In case of pellet plant, the use of a highly volatile solid fuel in the iron ore pellets is also not recommended. The highly volatile content might lead to accumulation in the off gases and might provoke fires in the gas cleaning installation of the pellet plant.

d. In case of electric arc furnaces, the biomass also needs to have a very low volatile content when replacing for example petroleum coke (petcoke) in the electric arc furnace. In this case the objective is the foaming of the slag by gasification of carbon. This requires a certain residence time which cannot be achieved if the volatile content is high.

Furthermore, highly volatile solid fuel can reduce the product quality of the sinter and pellet plant, therefore may have a negative impact on the plant productivity.

It is thus required to treat the biomass to reduce its volatile content before it can be used in the steel making process. This is principally already known and done, either in the blast furnace (BF) or as fuel in the sinter plant and pellet plant However, this is often still not sufficient to make the use of biomass economically viable.

BRIEF SUMMARY

The present disclosure proposes a method which reduces the $CO_2$ footprint of an industrial process and makes the use of biomass economically viable at the same time.

The present disclosure proposes a method for providing raw material for an industrial process, in particular for steel production, comprising a. torrefying a torrefaction material, which comprises biomass, in a reactor by thermochemically treating the torrefaction material at a temperature from 200° C. to 600° C., to obtain bio coal, b. extracting the bio coal from the reactor at a first temperature of up to 600° C., c. providing bulk material at a second temperature between 0° C. and 100° C., d. mixing bio coal with bulk material, thereby cooling down the bio coal with the bulk material and
   obtaining a mixture of bulk material and bio coal at a third temperature, below the self-ignition temperature of the mixture, and e. using the mixture to provide the raw material for the industrial process.

The method thus allows cooling the hot bio coal (also called torrefied biomass, bio charcoal, charcoal) quickly and efficiently and allows at the same time to make it more useful in industrial production and power generation, in particular in the process of steelmaking.

The $CO_2$ footprint of industrial production and power generation, in particular of the steel making process in particular, is reduced since fossil fuel is replaced by biomass.

Preferably, between 5% v/v and 95% v/v of bio coal are mixed with between 95% v/v and 5% v/v of bulk material. As common with particulate materials and/or bulk materials, a certain volume of bio coal or bulk material normally comprises spaces or voids between the particles. For instance, 1 m³ of bio coal is normally filled only to a certain degree with bio coal as such, while spaces between bio-coal particles are filled with gas, e.g., air. In order to determine the volume percentage of each component, the individual component (bio coal or bulk material) can be filled into a measuring vessel, where the surface level of the component corresponds to certain volume. It will be understood that due to the voids in between the particles, the volume of the mixture may be reduced, e.g., mixing 1 m³ of bio coal with 1 m³ of bulk material can yield less than 2 m³ of mixture, since some of the bulk-material particles fit into voids between the bio-coal particles, or vice versa.

The term "bulk material" not only refers to a single material having homogeneous composition, but also refers to a mixture or other combination of several bulk materials. The bulk material may be dry. Alternatively, it may comprise residual moisture.

In an embodiment, a cooling fluid is added in the cooling step, which cooling fluid may be chosen among water and an inert gas, like nitrogen.

In an embodiment, the method comprises grinding and/or crushing the bio coal prior to mixing it with the bulk material.

The grinding and/or crushing of the bio coal and/or the mixing of the bio coal with the bulk material may be realized under inert atmosphere in one embodiment. This inert atmosphere may be obtained by reducing the oxygen content of the atmosphere, for example by adding nitrogen and steam, and/or water which will evaporate when in contact with the hot bio coal and create steam.

Preferably, the bio coal is extracted from the reactor at a first temperature not higher than 500° C., and more preferably between 200 and 450° C.

It is preferred that the bulk material has a second temperature not higher than 50° C., and more preferably between 15 and 35° C.

The method may also comprise grinding and/or crushing the mixture of bulk material and bio coal.

The product of this torrefaction process can also be mixed with iron (Fe) bearing material and can then advantageously be integrated for example in the sintering and/or pelletising process or added as fuel in the EAF and/or blast furnace. Such iron (Fe) bearing material can be chosen among iron ore, iron oxides like magnetite ($Fe_3O_4$) or hematite ($Fe_2O_3$), usually along with gangue minerals, waste or residual materials, sinter and/or pellet feed In an embodiment, the cooled mixture of bulk material and bio coal can be mixed with another material such as for example another solid fuel such as coke or coal and be used easily in any industrial production and power generation.

One unexpected advantage of this method is that it provides a safe product facilitating its transport and storage, when compared to 100% bio coal handling. Indeed, the mixture of both materials is a safe product, which will not self-ignite during transport and storage. The product needs not to be stored under inert atmosphere, which makes it easier and less costly to handle.

Cooling down the bio coal with a second stream of bulk material and transport and store as a mix together, brings the advantage that no inertisation is needed, and self-ignition is avoided at all times.

A further advantage is that cooling down the hot bio coal with a second stream of bulk material, would lead to lower investment and operational cost, when compared to an installation with a dedicated hot bio coal cooling system.

The classical torrefied bio coal tends to easily re-ignite during storage and transport and therefore, higher precautions, e.g. inertisation with nitrogen, need to be taken, when compared to a mineral coal. This is especially true at the bio coal production premises, during and after the cooling systems that are used traditionally in the manufacturing of bio coal. The method as described above, wherein the bio coal is mixed with a second stream of bulk material and transported and stored as a mix, brings the advantage that no inertisation is needed, and self-ignition is avoided at all times.

Although the bio coal may re-ignite spontaneously in specific spots in the mixture, the flames cannot propagate and turn into an extended fire or hazardous situation. This is due to the fact, that the bulk material is mixed in such a ratio, that the second material mass can fully dissipate the heat from the reignited bio coal, in order to prevent a chain reaction happening within the complete material mix. The mixing ratio can vary depending on the bulk material utilized for the mixtures, but typically ranges in a volume ratio of 5% to 95% of bio coal compared to the bulk material.

Depending on the materials used, the mixture contrary to the bio coal itself does not fall under the ATEX regulations as set out in the Directive 2014/34/EU. The transport and handling of the mixture is thus much safer and cheaper as the handling of the bio coal alone.

It is an advantage of the proposed method to mix the produced bio coal with another material, which is not easily flammable.

This proposed method to cool down hot bio coal, makes it possible to avoid a dedicated cooling equipment, when compared to a classical torrefaction plant producing bio coal.

"Torrefying" or "torrefaction" means a process in which a starting material is subjected to a certain heat treatment. Torrefaction is a thermochemical (see e.g., https://en.wikipedia.org/wiki/Thermochemical) treatment of biomass or a form of pyrolysis. Although sometimes a temperature range between 200° C. and 320° C. is associated with the term "torrefaction" a wider range is in the context of the present disclosure. In this context, the temperature for a torrefaction process can be from about 200° C. to about 600° C., preferably at least 250° C., 275° C., 300° C., 325° C., 350° C., 375° C. or 400° C. The maximum temperature is preferably below 600° C., 575° C., 550° C., 525° C., 500° C., 475° C., 450° C., 452° C. or below 400° C. Typically, it is carried out under atmospheric pressure and in the absence of oxygen, i.e. with no air. During the torrefaction process, the water contained in the biomass as well as superfluous volatiles are released, and the biopolymers (cellulose, hemi-cellulose and lignin) partly decompose, giving off various types of volatiles. The final product is the remaining solid, dry, blackened material that is referred to as torrefied biomass or bio coal. As will become apparent below, the torrefaction may be performed not exclusively on biomass, but also on other organic material.

During the torrefaction process, the biomass (or the torrefaction material) typically loses up to 80% of its mass (bone dry basis), with no appreciable change in volume. The gaseous energy (the volatiles) can be used as a heating fuel for the torrefaction process and for secondary processes, such as hot water or electric energy generation as example. After the torrefaction material is torrefied, it can be densified, usually into briquettes or pellets using conventional densification equipment, to increase its mass and energy density and to improve its hydrophobic properties. The final product may repel water and thus can be stored in moist air or rain without appreciable change in moisture content or heating value, unlike the original biomass/torrefaction material.

The torrefaction process often also denoted as "mild pyrolysis" in which organic compounds are partially degraded and flammable gases are formed. However, also pyrolysis and carbonisation processes are included in the present document under the term "torrefaction". More generally, the torrefaction in the context of the present disclosure could also be referred to as a "pyrolysis" and the torrefaction material could be referred to as a "pyrolysis material".

If torrefaction material comprising biomass is torrefied, this yields so-called torrefied biomass (bio coal), which possesses a number of special properties. The first property is hydrophobicity; the material loses its natural property of moisture absorption and biological degradability and is therefore more stable during storage than hydrophilic, non-torrefied biomass is burned (such as, for example, wood and straw). In addition, there is less smoke formation when torrefied biomass is burned, compared with when non-torrefied biomass is burned.

In fact, the torrefaction of biomass produces a big amount of gas. Depending on the fix carbon content of the initial product, typically between 20 to 50% of the energy of the torrefaction material/biomass is recovered in gaseous/liquid form. A small part of this energy is used for the torrefaction process and another part can for example being used for the drying of the biomass.

When high C fix contents are required, the relation gaseous product to solid product increases, leading to a surplus of gaseous energy, due to the partial gasification of the torrefaction material/biomass (the volatiles). This surplus of gaseous energy can easily be used to reduce the consumption of other fossil energies in the industrial process and thus further reduce its carbon footprint. In many industrial operations steam is required. The gas can therefore be used for the production of steam in a dedicated boiler. Also, the surplus of gaseous energy could be used in the burner systems. In case of the iron or steel plant, it could be introduced into the ignition hood of the sinter machine, or into combustion chamber of a pellet plant, in a coal GAD (grinding and drying) plant, for heating of the cowpers, in a rolling mill etc.

Types of biomass used in the present method include but are not limited to dedicated energy crops, agricultural crop residues, forestry residues, algae, wood processing residues, municipal waste, wet waste, crop wastes, purpose-grown grasses, woody energy crops, industrial wastes, sorted municipal solid waste [MSW], urban wood waste, demolition wood, furniture waste and/or waste from furniture production.

Bulk materials for the present method include all kind of granular or powder materials apt to reduce the ignition temperature of the bio coal. More specifically the material may comprise at least one iron containing material like iron ore, iron oxides like magnetite ($Fe_3O_4$) or hematite ($Fe_2O_3$), usually along with gangue minerals and also waste or residual materials, sinter and/or pellet feed. The iron-containing material comprises at least 5 wt.-% of iron. Additionally or alternatively, the bulk material may comprise coal, pet coke and the like, sometimes along with waste or residual materials and/or additives. The bulk material may also comprise a plastic material. It is understood that mixtures of any of the abovementioned materials can be used as well.

In the present method, the bio coal may be mixed preferably with up to 90%, 85%, 80%, 75%, 70%, 65%, 60%, 55%, 50%, 45%, 40%, 35% or 30% v/v of bulk material.

In the present method, the bio coal may be mixed preferably with more than 10%, 15%, 20%, 25%, 30%, 35%, 40%, 45%, 50%, 55%, 60%, 65%, 70%, 75% or 80% v/v of bulk material.

The present method may also make usage of non-biomass wastes such as plastics and/or rubber. In the present method, the torrefaction material may comprise at least 5% v/v of non-biomass material. Also, it may comprise up to 5%, 7%, 10%, 12%, 15%, 17%, 20%, 23%, 25%, 30%, 35% or 40% v/v of non-biomass material.

According to an embodiment, the torrefaction material comprises iron-containing by-products originated from steel production, such as oily sludge and/or mill scales. Preferably these by-products could thus replace some of the biomass in the method described above. Such by-products could thus be used in a quantity of at least 5% v/v and/or in a quantity of up to 5%, 7%, 10%, 12%, 15%, 17%, 20%, 23%, 25%, 30%, 35% or 40% v/v of the torrefaction material. When integrating such oily sludge and/or mill scales in the torrefaction process, the cost situation can be dramatically improved. The oil from the oily mill scale will be decomposed in a gaseous form and leave the torrefaction process together with the torrefaction gases. Some sinter plant operations are currently limited in the usage of by-products, due to restriction in the gas-cleaning system. Integrating such by-products to another process, could bring the advantage that no additional investment at sinter plant gas cleaning units is needed, to comply with legal limitation.

In an embodiment, waste heat from industrial operations, power plants, steel plants etc and/or utilization of industrial gases such as blast furnace gas are used in the torrefaction process to maximize the production of volatiles and gas and to maximize the valorization of the products from the torrefaction process. The integration of the torrefaction process in the industrial operations allows to supply low-cost energy from other sources, such as waste heat, example from the steel plant or a power plant and/or utilization of other gases to maximize the valorization of the products from the pyrolysis process.

Besides the bio coal also a gas phase is created. When cooling that gas phase, a condensable liquid phase will be created. Since other energy sources are readily available in a steel plant or a power plant "for free", this liquid phase can be separated and used as a separate $CO_2$ lean product in other industries to further reduce the $CO_2$ footprint.

Mixing may be performed in various ways, like actively by mechanical mixing of the bulk material and bio coal particles (plus optional other components) in a suitable vessel. Suitable devices include a pin mixer, a paddle mixer, or a rotary drum mixer. Mixing may also be performed more or less passively, e.g. by pouring the bulk-material particles and the bio-coal particles onto a conveyor belt or into a vessel at the same time, which will also result in at least a certain degree of mixing. Other suitable mixing methods known in the art may be used as well. Optionally, the mixing can be combined with the charging of a transport vessel, like a truck, a container, a train wagon, a ship or the like. This may be a form of passive mixing as indicated above or it may be combined with active mixing immediately before charging the particulate material to the transport vessel.

Preferably, the method also comprises forming compound bodies from the mixture of bulk material and bio coal. In particular, each compound body may be solid and may comprise particulate iron-containing material and bio coal.

DETAILED DESCRIPTION

Figure 1:
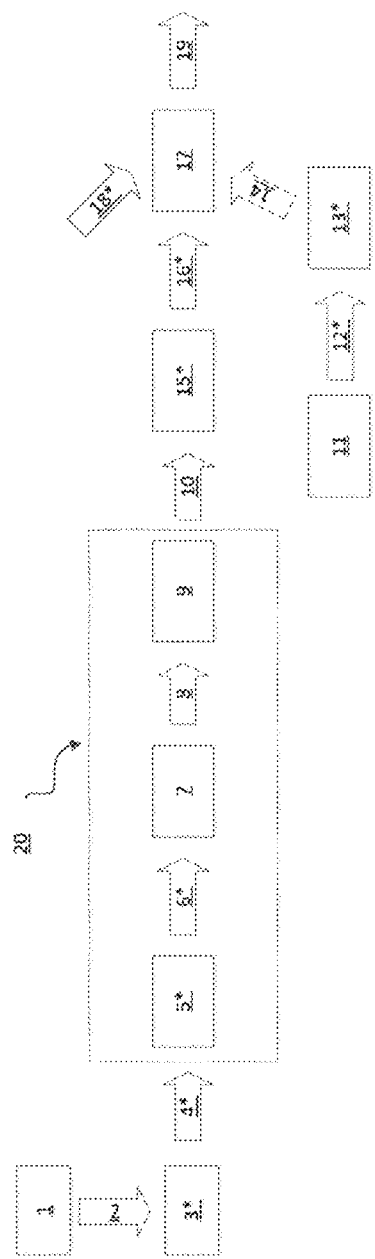
FIG. 1 is a diagram representing the different equipment used in a preferred embodiment.

As can be seen on FIG. 1, the materials to be torrefied are gathered in a feedstock plant 1, such as a forest, a recycling centre, in general a source of waste to be pyrolysied. Here, the components of the torrefaction material, i.e., materials like biomass, wood, forest debris, plastic, rubber or any other kind of by-products suitable to be pyrolyzed, are collected and stored before they are transferred via a conveyer belt 2 to a crushing and classification unit 3 where the particle size of the feedstock materials is reduced to a size range that can be easily transported and further processed. The crushed and classified feedstock having now a uniform size between 20 mm and 50 cm, is transferred via a conveyer belt 4 to a drying unit 5. In this unit 5, the moisture content of the feedstock is reduced to about 30% w/w or lower. After drying, the materials are subsequently transported via a conveyer belt 6 to the torrefaction unit 7 where they are torrefied at temperatures of about 200° C. to 550° C. without oxygen.

The torrefied feedstock is then evacuated from the torrefaction unit 7 via a conveyor belt 8 to a bio coal discharge unit 9. From here, the hot bio coal is transported on a conveyor belt 10 to a crushing unit 15 and after crushing via a further conveyor belt 16 to a mixing unit 17. Such a mixing unit 17 is typically a mixing drum, a paddle type mixing unit etc.

In a silo 11, bulk material, like iron ore, limestone, dolomite etc. to be used as a cooling material is stocked. When needed, bulk material is transferred from the silo 11 via a conveyor belt 12 to a bulk material conditioning unit 13, typically for grinding, drying etc. before it is transferred via a further conveyor belt 14 to said mixing unit 17. Here it is mixed with the hot bio coal to form a cooled mix of bio coal and bulk material.

Further materials used to adjust the properties of the mix may be added in the mixing unit 17. These further materials may be solid or liquid and are used to adjust mixture characteristics, but not for cooling purpose. One such material may be a binding agent so that the mixture of bio coal and bulk material can be more easily formed into pellets, which can be processed further more easily. It may be added to the mixing unit 17 via a conveyor belt 18.

The mix comprising bio coal and bulk material and optionally additional material is evacuated from the mixing unit 17 via a conveyor belt 19 to a silo or for further processing before use.

It must be noted that the steps 3, 4, 5, 6, 12, 13 and 18 provided with an * in FIG. 1 are optional steps.

Instead of a conveyor belt, other types of conveying equipment like a screw conveyor, a chain conveyor or any other kind of suitable conveyor can be used in any of the steps described above. In order to transport the materials over longer distances trucks or ships may be used.

The entire process may take place in one location or particulars steps may take place in different locations.

Figure 2:
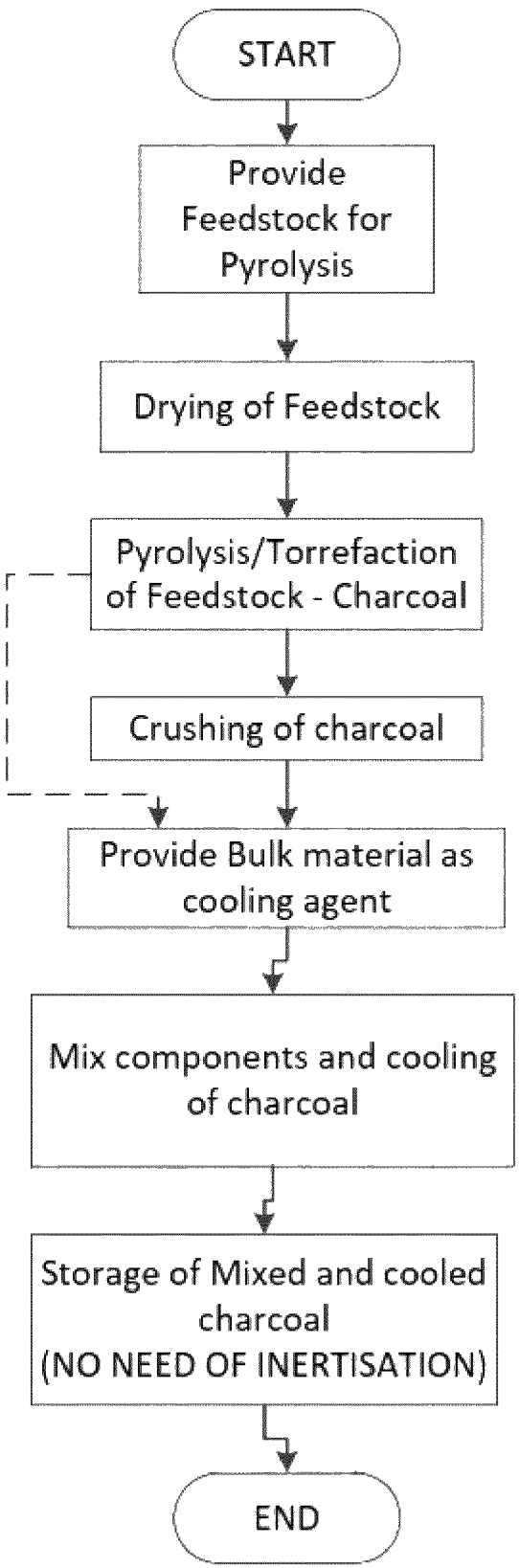
FIG. 2 represents a flow chart of the different operations of a preferred embodiment.

In FIG. 2, a flow chart of the different operations of a preferred embodiment is represented by a succession of different boxes describing the steps of the process.

At the top of the flow chart below the box "START", in a first step, the feedstock for the process is provided. The feedstock for the torrefaction/pyrolysis (i.e. the torrefaction material) comprises typically forest debris and other fresh wood, mixed as deciduous and coniferous woodchips (debarked or not), other waste materials such as SFR (Solid Recovered Fuel) or other.

In the next step "Drying of Feedstock", the torrefaction/pyrolysis feedstock may be dried so as to lower the moisture content to a water content to as low as 5% w/w or less before feeding the dried feedstock into the torrefaction/pyrolysis reactor. In the next step "Torrefaction/Pyrolysis of Feedstock—charcoal", the feedstock is torrefied at a temperature ranging from 200 to 600° C. At the end of the torrefaction process, the torrefied feedstock (charcoal/bio coal) is being discharged to a cooling system. At that stage the torrefied feedstock is at same temperature as the set torrefaction temperature (200-600° C.).

Instead of completely cooling down the bio coal/charcoal in a dedicated cooler system with water and air, a bulk material is provided typically having a temperature around 20° C. as cooling agent.

Optionally, to improve the mixing and cooling behavior water can be injected into the mix and indirect cooling by cold air supply can be used in addition to the bulk material.

In the step "Provide bulk material as cooling agent", bulk material having a temperature of about 20° C., is and provided with mixed the hot bio coal/charcoal having a temperature of more than 350° C. at this stage in the step "Mixing components and cooling of charcoal". A mixing volume ratio between bio coal/charcoal and the cold bulk material ranging from 1:19 to 19:1 can be used. This mixing ratio may be adapted, as required. In one example, this may correspond to a mixing mass ratio of 1:9. The charcoal is being cooled down and the bulk material heats up. Such a mixing operation results in a mix having a temperature of less than 60° C. This process step can be performed under inert conditions. The inertisation gas can be nitrogen or water vapour. In case water is being injected into the mixing unit, the same can generate an inert condition by water vapour generation.

Finally, in the last step "Storage of the mixed and cooled charcoal (no need for inertisation)", the mixed and cooled material are stored until further use.

The invention claimed is:

1. A method for providing raw material for an industrial process, in particular for steel production, comprising:
    torrefying a torrefaction material, which comprises biomass, in a reactor by thermochemically treating the torrefaction material at a temperature of 200° C. to 600° C., to obtain bio coal,
    extracting the bio coal from the reactor at a first temperature of up to 600° C.,
    providing bulk material at a second temperature between 0° C. and 100° C., mixing bio coal with a bulk material, thereby cooling down the bio coal with the bulk material and
    obtaining a mixture of bulk material and bio coal at a third temperature, below the self-ignition temperature of the mixture, and
    using the mixture to provide the raw material for the industrial process.

2. The method according to claim 1, wherein between 5% v/v and 95% v/v of bio coal are mixed with between 95% v/v and 5% v/v of bulk material.

3. The method according to claim 1 or 2, wherein the bulk material comprises residual moisture.

4. The method according to claim 1, wherein a cooling fluid is added in the cooling step, said cooling fluid being chosen among water and an inert gas.

5. The method according to claim 1, further comprising grinding and/or crushing the bio coal prior to mixing it with the bulk material.

6. The method according to claim 5, wherein the grinding and/or crushing of the bio coal and/or the mixing of the bio coal with the bulk material is realized under inert atmosphere.

7. The method according to claim 1, wherein the bio coal is extracted from the reactor at a first temperature of not higher than 500° C.

8. The method according to claim 1, wherein the bulk material has a second temperature not higher than 50° C.

9. The method according to claim 1, further comprising grinding and/or crushing the mixture of bulk material and bio coal.

10. The method according to claim 1, wherein the biomass comprise dedicated energy crops, agricultural crop residues, forestry residues, algae, wood processing residues, municipal waste, wet waste, crop wastes, purpose-grown grasses, woody energy crops, industrial wastes, sorted municipal solid waste [MSW], urban wood waste, demolition wood, furniture waste and/or waste from furniture production.

11. The method according to claim 1, wherein the bulk material comprises at least one iron containing material, iron oxides like magnetite ($Fe_3O_4$) or hematite ($Fe_2O_3$), along with gangue minerals and also waste or residual materials, sinter and/or pellet feed, which iron containing material comprises at least 5 wt.-% of iron.

12. The method according to claim 1, wherein the bulk material comprises at least one granular material like coal, pet coke, along with waste or residual materials and/or additives.

13. The method according to claim 1, wherein the torrefaction material comprises at least 5% v/v of non-biomass wastes.

14. The method according to claim 1, wherein the torrefaction material comprises at least 5% v/v of iron containing by-products originated from steel production.

15. The method according to claim 1, further comprising forming compound bodies from the mixture of bulk material and bio coal.

16. The method according to claim 15, wherein each compound body is solid and comprises particulate iron-containing material and bio coal.

* * * * *